United States Patent
Jin et al.

(10) Patent No.: US 9,867,088 B2
(45) Date of Patent: Jan. 9, 2018

(54) LOCATION AREA MANAGEMENT METHOD AND CORE NETWORK CONTROLLER

(71) Applicant: Huawei Technologies Co., Ltd., Shenzhen, Guangdong (CN)

(72) Inventors: Weisheng Jin, Shanghai (CN); Bin Tan, Lima (PE); Ying Huang, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 0 days.

(21) Appl. No.: 14/947,808

(22) Filed: Nov. 20, 2015

(65) Prior Publication Data
US 2016/0080979 A1    Mar. 17, 2016

Related U.S. Application Data

(63) Continuation of application No. PCT/CN2013/076166, filed on May 23, 2013.

(51) Int. Cl.
*H04W 68/00* (2009.01)
*H04W 36/00* (2009.01)
(Continued)

(52) U.S. Cl.
CPC ....... *H04W 36/0016* (2013.01); *H04W 48/16* (2013.01); *H04W 60/00* (2013.01)

(58) Field of Classification Search
CPC . H04W 36/0016; H04W 48/16; H04W 60/00; H04W 60/04; H04W 48/12; H04W 48/14; H04W 64/003
(Continued)

(56) References Cited

U.S. PATENT DOCUMENTS 6,556,820 B1 * 4/2003 Le .................... H04W 8/26
                                                340/7.21
9,198,124 B2 * 11/2015 Dahlen ............. H04W 48/18
(Continued)

FOREIGN PATENT DOCUMENTS

CN    101141752 A    3/2008
CN    101489212 A    7/2009
(Continued)

OTHER PUBLICATIONS

"Tracking Area Update procedure with ISR functionality", Nokia Siemens Netwroks, Nokia, 3GPP TSG SA WG2 Meeting #61, Nov. 12-16, 2007, 4 pages, TD S2-075651.
(Continued)

*Primary Examiner* — Jean Gelin (57) ABSTRACT

Embodiments of the present invention provide a location area management method and a core network controller, where the method is performed by a core network controller includes: receiving a location update request message sent by a UE in a first network standard; generating a paging area list including at least a first location area identity used to indicate a location area of the first network standard and a second location area identity used to indicate a location area of a second network standard; and adding the paging area list to a location update accept message and sending the location update accept message to the UE. According to the method and the core network controller, unified management is performed on location areas of different network standards, collaboration on an inter-standard location update is implemented, and management efficiency of a location area is improved.

14 Claims, 5 Drawing Sheets

(51) Int. Cl.
*H04W 60/00* (2009.01)
*H04W 48/16* (2009.01)

(58) Field of Classification Search
USPC ......... 455/412.1, 412.2, 414.1, 456.1, 456.2, 455/456.3, 456.6, 458, 459
See application file for complete search history.

(56) References Cited

U.S. PATENT DOCUMENTS

| | | | | |
|---|---|---|---|---|
| 9,313,729 | B2* | 4/2016 | Dahlen | H04W 48/18 |
| 2002/0183075 | A1* | 12/2002 | Fauconnier | H04W 4/02 |
| | | | | 455/456.1 |
| 2003/0040314 | A1* | 2/2003 | Hogan | H04W 60/00 |
| | | | | 455/435.1 |
| 2004/0248571 | A1* | 12/2004 | Robinson | H04L 47/14 |
| | | | | 455/433 |
| 2008/0207170 | A1 | 8/2008 | Khetawat et al. | |
| 2010/0285801 | A1* | 11/2010 | Pudney | H04W 60/00 |
| | | | | 455/435.1 |
| 2011/0158161 | A1* | 6/2011 | Jain | H04W 4/18 |
| | | | | 370/328 |
| 2011/0171975 | A1* | 7/2011 | Yin | H04W 8/02 |
| | | | | 455/456.2 |
| 2011/0171987 | A1* | 7/2011 | Yin | H04W 68/04 |
| | | | | 455/515 |
| 2011/0190010 | A1* | 8/2011 | Cho | H04W 60/04 |
| | | | | 455/458 |
| 2011/0195714 | A1 | 8/2011 | Sawinathan | |
| 2012/0157093 | A1 | 6/2012 | Zhu et al. | |
| 2012/0195255 | A1 | 8/2012 | Nylander et al. | |

FOREIGN PATENT DOCUMENTS

| | | |
|---|---|---|
| CN | 102026143 A | 4/2011 |
| EP | 2355600 A1 | 8/2011 |
| JP | 2013009028 A | 1/2013 |
| JP | 2013503506 A | 1/2013 |

OTHER PUBLICATIONS

"Correct inconsistency with Stage 1 regrading support for emergency bearer services in the serving network", Change Request, Research In Motion UK Ltd., SA WG2 Meeting #97, May 27-31, 2013, 42 pages, S2-131579.

* cited by examiner

LOCATION AREA MANAGEMENT METHOD AND CORE NETWORK CONTROLLER

CROSS-REFERENCE TO RELATED APPLICATIONS

This application is a continuation of International Application No. PCT/CN2013/076166, filed on May 23, 2013, which is hereby incorporated by reference in its entirety.

TECHNICAL FIELD

Embodiments of the present invention relate to communications technologies, and in particular, to a location area management method and a core network controller.

BACKGROUND

With development of communications technologies, the Third Generation Partnership Project (3GPP) performs research and standardization work on a 4G Long Term Evolution (LTE) technology, expecting to obtain a higher speed, a higher capacity, and better user performance. At a preliminary stage during LTE deployment, an LTE network is deployed only on a hot spot, but full coverage is performed for a 2G/3G network. In an area where multiple wireless networks overlap or are adjacent, when a UE (user equipment) moves back and forth between the LTE network and the 2G/3G network, inter-system cell reselection needs to be performed frequently for the UE. Each time of the inter-system cell reselection leads to a location update procedure of the UE to update location information that is of the UE and is registered on a core network, and causes an increase of a large amount of signaling load on the network and an air interface.

In the prior art, 3GPP introduces an idle state signaling reduction (ISR) mechanism. After the ISR mechanism is activated, when UE moves in a coverage area in which the UE is registered, even across a standard, no location update needs to be performed. For example, UE is registered with both LTE and 2G/3G, and the network and the UE separately and independently manage registered location area information; when the UE moves in a location area in which the UE is registered, no location update is performed. The ISR mechanism can prevent frequent occurrence of a location update; however, management of location areas of different network standards is implemented by different core network nodes, and management of location areas of various network standards is independently performed, and therefore cannot be performed in an effectively collaborative manner.

SUMMARY

Embodiments of the present invention provide a location area management method and a core network controller, so as to perform unified management on location areas of different network standards, implement collaboration on an inter-standard location update, and improve management efficiency of a location area.

According to a first aspect, an embodiment of the present invention provides a location area management method, including:

receiving, by a core network controller, a location update request message sent by a user equipment UE in a first network standard;

generating, by the core network controller, a paging area list, where the paging area list includes at least a first location area identity used to indicate a location area of the first network standard and a second location area identity used to indicate a location area of a second network standard; and adding, by the core network controller, the paging area list to a location update accept message and sending the location update accept message to the UE.

In a first possible implementation manner of the first aspect, the location update request message carries first location information, or the location update request message is carried in a location update trigger message, where the location update trigger message carries the first location information, and the first location information is used to indicate a location in which the UE is located when sending the location update request message in the first network standard; and the generating, by the core network controller, a paging area list includes:

generating, by the core network controller, the paging area list according to the first location information.

With reference to the first possible implementation manner of the first aspect, in a second possible implementation manner, the generating, by the core network controller, the paging area list according to the first location information includes:

determining, by the core network controller according to the first location information, the first location area identity used to indicate the location area of the first network standard;

mapping, by the core network controller, the first location information to second location information of the second network standard according to a mapping relationship;

determining, by the core network controller according to the second location information, the second location area identity used to indicate the location area of the second network standard; and generating, by the core network controller, the paging area list according to the first location area identity and the second location area identity.

With reference to the first possible implementation manner of the first aspect, in a third possible implementation manner, the location update trigger message further carries second location information, and there is a mapping relationship between the first location information and the second location information; and the generating, by the core network controller, the paging area list according to the first location information includes:

determining, by the core network controller according to the first location information, the first location area identity used to indicate the location area of the first network standard;

determining, by the core network controller according to the second location information, the second location area identity used to indicate the location area of the second network standard; and generating, by the core network controller, the paging area list according to the first location area identity and the second location area identity.

With reference to the first aspect or any one of the first to the third possible implementation manners of the first aspect, in a fourth possible implementation manner, after the receiving, by a core network controller, a location update request message sent by a UE in a first network standard and before the adding, by the core network controller, the paging area list to a location update accept message and sending the location update accept message to the UE, the method further includes:

allocating, by the core network controller to the UE, a first temporary identity used in the first network standard and a second temporary identity used in the second network standard; and the adding, by the core network controller, the paging area list to a location update accept message and sending the location update accept message to the UE includes:

adding, by the core network controller, the paging area list, the first temporary identity, and the second temporary identity to the location update accept message and sending the location update accept message to the UE.

With reference to the first aspect or any one of the first to the third possible implementation manners of the first aspect, in a fifth possible implementation manner, after the receiving, by a core network controller, a location update request message sent by a UE in a first network standard and before the adding, by the core network controller, the paging area list to a location update accept message and sending the location update accept message to the UE, the method further includes:

allocating, by the core network controller to the UE, a uniform temporary identity used in the first network standard and the second network standard; and the adding, by the core network controller, the paging area list to a location update accept message and sending the location update accept message to the UE includes:

adding, by the core network controller, the paging area list and the uniform temporary identity to the location update accept message and sending the location update accept message to the UE.

With reference to the fifth possible implementation manner of the first aspect, in a sixth possible implementation manner, the location update request message further carries indication information of supporting unified management of a temporary identity, and the location update accept message further carries indication information of activating unified management of a temporary identity.

With reference to the first aspect or any one of the first to the sixth possible implementation manners of the first aspect, in a seventh possible implementation manner, after the adding, by the core network controller, the paging area list to a location update accept message and sending the location update accept message to the UE, the method further includes:

receiving, by the core network controller, a downlink data notification message sent by a serving gateway S-GW, and sending a paging message to an access network device in at least one location area recorded in the paging area list.

With reference to the seventh possible implementation manner of the first aspect, in an eighth possible implementation manner, the paging message carries the uniform temporary identity.

With reference to the seventh possible implementation manner of the first aspect, in a ninth possible implementation manner, the sending, by the core network controller, a paging message to an access network device in at least one location area recorded in the paging area list includes:

sending, by the core network controller, a first paging message to a first access network device in a location area that is of the first network standard and is recorded in the paging area list, where the first paging message carries the first temporary identity that is allocated to the UE and used in the first network standard; and sending, by the core network controller, a second paging message to a second access network device in a location area that is of the second network standard and is recorded in the paging area list, where the second paging message carries the second temporary identity that is allocated to the UE and used in the second network standard.

With reference to the seventh possible implementation manner of the first aspect, in a tenth possible implementation manner, the sending, by the core network controller, a paging message to an access network device in at least one location area recorded in the paging area list includes:

sending, by the core network controller by using a single radio controller SRC, the paging message to the access network device in the at least one location area recorded in the paging area list.

With reference to the first possible implementation manner of the first aspect, in an eleventh possible implementation manner, the location update request message is a non-access stratum message, and the location update trigger message is an initial UE message or an uplink non-access stratum transport message, where the initial UE message or the uplink non-access stratum transport message is sent by an access network device.

In a twelfth possible implementation manner, the location update request message further carries indication information of supporting management of inter-standard location areas, and the location update accept message further carries indication information of activating management of inter-standard location areas.

According to a second aspect, the present invention provides a core network controller, including:

a receiving unit, configured to receive a location update request message sent by a UE in a first network standard;

a processing unit, configured to generate a paging area list, where the paging area list includes at least a first location area identity used to indicate a location area of the first network standard and a second location area identity used to indicate a location area of a second network standard; and a sending unit, configured to add the paging area list generated by the processing unit to a location update accept message and send the location update accept message to the UE.

In a first possible implementation manner of the second aspect, the location update request message carries first location information, or the location update request message is carried in a location update trigger message, where the location update trigger message carries the first location information, and the first location information is used to indicate a location in which the UE is located when sending the location update request message in the first network standard; and the processing unit is further configured to generate the paging area list according to the first location information.

With reference to the first possible implementation manner of the second aspect, in a second possible implementation manner, the processing unit is further configured to: determine, according to the first location information, the first location area identity used to indicate the location area of the first network standard, map the first location information to second location information of the second network standard according to a mapping relationship, determine, according to the second location information, the second location area identity used to indicate the location area of the second network standard, and generate the paging area list according to the first location area identity and the second location area identity.

With reference to the first possible implementation manner of the second aspect, in a third possible implementation manner, the location update trigger message further carries second location information, and there is a mapping relationship between the first location information and the second location information; and the processing unit is further configured to: determine, according to the first location information, the first location area identity used to indicate the location area of the first network standard, determine, according to the second location information, the second location area identity used to indicate the location area of the second network standard, and generate the paging area list according to the first location area identity and the second location area identity.

With reference to the second aspect or any one of the first to the third possible implementation manners of the second aspect, in a fourth possible implementation manner, the processing unit is further configured to allocate, to the UE, a first temporary identity used in the first network standard and a second temporary identity used in the second network standard, and the sending unit is further configured to add the paging area list, the first temporary identity, and the second temporary identity to the location update accept message and send the location update accept message to the UE.

With reference to the second aspect or any one of the first to the third possible implementation manners of the second aspect, in a fifth possible implementation manner, the processing unit is further configured to allocate a uniform temporary identity to the UE, and the sending unit is further configured to add the paging area list and the uniform temporary identity to the location update accept message and send the location update accept message to the UE.

With reference to the fifth possible implementation manner of the second aspect, in a sixth possible implementation manner, the location update request message further carries indication information of supporting unified management of a temporary identity, and the location update accept message further carries indication information of activating unified management of a temporary identity.

With reference to the second aspect or any one of the first to the sixth possible implementation manners of the second aspect, in a seventh possible implementation manner, the receiving unit is further configured to receive a downlink data notification message sent by a serving gateway S-GW, and the sending unit is further configured to send a paging message to an access network device in at least one location area recorded in the paging area list.

With reference to the seventh possible implementation manner of the second aspect, in an eighth possible implementation manner, the paging message carries the uniform temporary identity.

With reference to the seventh possible implementation manner of the second aspect, in a ninth possible implementation manner, the sending unit is further configured to: send a first paging message to a first access network device in a location area that is of the first network standard and is recorded in the paging area list, where the first paging message carries the first temporary identity that is allocated to the UE and used in the first network standard, and send a second paging message to a second access network device in a location area that is of the second network standard and is recorded in the paging area list, where the second paging message carries the second temporary identity that is allocated to the UE and used in the second network standard.

With reference to the seventh possible implementation manner of the second aspect, in a tenth possible implementation manner, the sending unit is further configured to send, by using a single radio controller SRC, the paging message to the access network device in the at least one location area recorded in the paging area list.

With reference to the first possible implementation manner of the second aspect, in an eleventh possible implementation manner, the location update request message is a non-access stratum message, and the location update trigger message is an initial UE message or an uplink non-access stratum transport message, where the initial UE message or the uplink non-access stratum transport message is sent by an access network device.

In a twelfth possible implementation manner of the second aspect, the location update request message further carries indication information of supporting management of inter-standard location areas, and the location update accept message further carries indication information of activating management of inter-standard location areas.

According to a third aspect, an embodiment of the present invention provides a core network controller, including:

a receiver, configured to receive a location update request message sent by a UE in a first network standard;

a processor, configured to generate a paging area list, where the paging area list includes at least a first location area identity used to indicate a location area of the first network standard and a second location area identity used to indicate a location area of a second network standard; and a transmitter, configured to add the paging area list generated by the processor to a location update accept message and send the location update accept message to the UE.

In a first possible implementation manner, the location update request message carries first location information, or the location update request message is carried in a location update trigger message, where the location update trigger message carries the first location information, and the first location information is used to indicate a location in which the UE is located when sending the location update request message in the first network standard; and the processor is further configured to generate the paging area list according to the first location information.

With reference to the first possible implementation manner of the third aspect, in a second possible implementation manner, the processor is further configured to: determine, according to the first location information, the first location area identity used to indicate the location area of the first network standard, map the first location information to second location information of the second network standard according to a mapping relationship, determine, according to the second location information, the second location area identity used to indicate the location area of the second network standard, and generate the paging area list according to the first location area identity and the second location area identity.

With reference to the first possible implementation manner of the third aspect, in a third possible implementation manner, the location update trigger message further carries second location information, and there is a mapping relationship between the first location information and the second location information; and the processor is further configured to: determine, according to the first location information, the first location area identity used to indicate the location area of the first network standard, determine, according to the second location information, the second location area identity used to indicate the location area of the second network standard, and generate the paging area list according to the first location area identity and the second location area identity.

With reference to the third aspect or any one of the first to the third possible implementation manners of the third aspect, in a fourth possible implementation manner, the processor is further configured to allocate, to the UE, a first temporary identity used in the first network standard and a second temporary identity used in the second network standard, and the transmitter is further configured to add the paging area list, the first temporary identity, and the second temporary identity to the location update accept message and send the location update accept message to the UE.

With reference to the third aspect or any one of the first to the third possible implementation manners of the third aspect, in a fifth possible implementation manner, the processor is further configured to allocate a uniform temporary identity to the UE, and the transmitter is further configured to add the paging area list and the uniform temporary identity to the location update accept message and send the location update accept message to the UE.

With reference to the fifth possible implementation manner of the third aspect, in a sixth possible implementation manner, the location update request message further carries indication information of supporting unified management of a temporary identity, and the location update accept message further carries indication information of activating unified management of a temporary identity.

With reference to the third aspect or any one of the first to the sixth possible implementation manners of the third aspect, in a seventh possible implementation manner, the receiver is further configured to receive a downlink data notification message sent by a serving gateway S-GW, and the transmitter is further configured to send a paging message to an access network device in at least one location area recorded in the paging area list.

With reference to the seventh possible implementation manner of the third aspect, in an eighth possible implementation manner, the paging message carries the uniform temporary identity.

With reference to the seventh possible implementation manner of the third aspect, in a ninth possible implementation manner, the transmitter is further configured to: send a first paging message to a first access network device in a location area that is of the first network standard and is recorded in the paging area list, where the first paging message carries the first temporary identity that is allocated to the UE and used in the first network standard, and send a second paging message to a second access network device in a location area that is of the second network standard and is recorded in the paging area list, where the second paging message carries the second temporary identity that is allocated to the UE and used in the second network standard.

With reference to the seventh possible implementation manner of the third aspect, in a tenth possible implementation manner, the transmitter is further configured to send, by using a single radio controller SRC, the paging message to the access network device in the at least one location area recorded in the paging area list.

With reference to the first possible implementation manner of the third aspect, in an eleventh possible implementation manner, the location update request message is a non-access stratum message, and the location update trigger message is an initial UE message or an uplink non-access stratum transport message, where the initial UE message or the uplink non-access stratum transport message is sent by an access network device.

In a twelfth possible implementation manner, the location update request message further carries indication information of supporting management of inter-standard location areas, and the location update accept message further carries indication information of activating management of inter-standard location areas.

It may be learned from the foregoing technical solutions that according to the location area management method and the core network controller provided in the embodiments of the present invention, the core network controller receives a location update request message sent by a UE, generates a paging area list, where the paging area list includes at least a first location area identity used to indicate a location area of a first network standard and a second location area identity used to indicate a location area of a second network standard, adds the paging area list to a location update accept message, sends the location update accept message to the UE, and notifies the UE that when the UE moves in a location area recorded in the paging area list, except a periodical location update, no location update needs to be initiated, so that unified management of location areas of different network standards by the core network controller and collaboration on an inter-standard location update are implemented, flexibility of location area management is improved, and location updates initiated by UEs with different moving characteristics can be more effectively optimized. At a preliminary stage or even within a period of time during LTE deployment, coverage distribution is discrete. By using the location area management method provided in the embodiments, there is a higher probability that an efficient dynamic paging area is formed in practice according to a moving characteristic of UE, with the UE being a center, and management efficiency of a location area is improved.

BRIEF DESCRIPTION OF THE DRAWINGS

To describe the technical solutions in the embodiments of the present invention more clearly, the following briefly introduces the accompanying drawings required for describing the embodiments or the prior art. Apparently, the accompanying drawings in the following description show some embodiments of the present invention, and persons of ordinary skill in the art may still derive other drawings from these accompanying drawings without creative efforts.

DETAILED DESCRIPTION

To make the objectives, technical solutions, and advantages of the embodiments of the present invention clearer, the following clearly describes the technical solutions in the embodiments of the present invention with reference to the accompanying drawings in the embodiments of the present invention. Apparently, the described embodiments are some but not all of the embodiments of the present invention. All other embodiments obtained by persons of ordinary skill in the art based on the embodiments of the present invention without creative efforts shall fall within the protection scope of the present invention.

Figure 1:
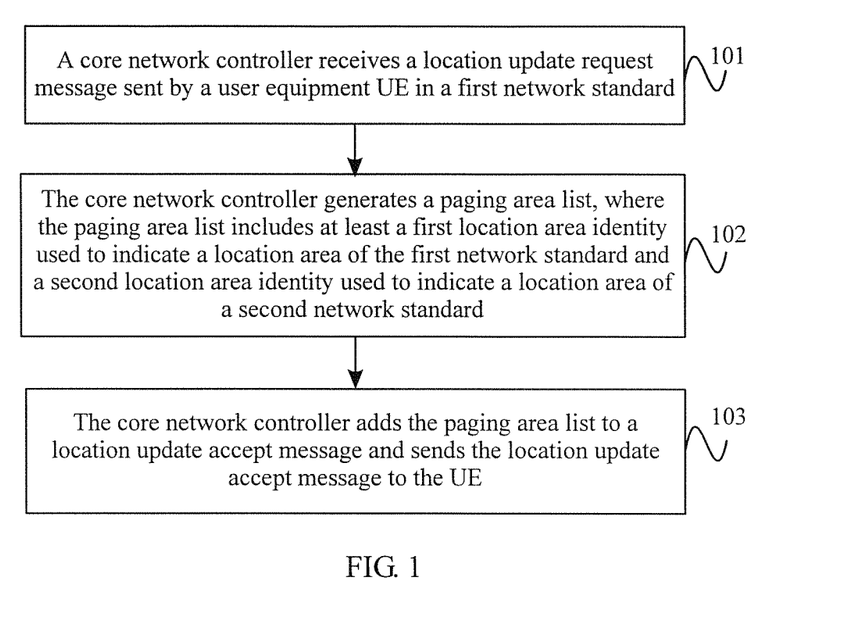
FIG. 1 is a flowchart of a first location area management method according to an embodiment of the present invention.

FIG. 1 is a flowchart of a first location area management method according to an embodiment of the present invention. As shown in FIG. 1, the location area management method provided in this embodiment may be specifically applied in a location area management process of a wireless communication system, where the wireless communication system is an application scenario in which at least two network standards, for example, an LTE network and a 2G/3G network, coexist. The 2G network includes a GSM (Global System of Mobile, Global System for Mobile Communications) network, a TDMA (Time Division Multiple Access, Time Division Multiple Access) network, and the like, and the 3G network includes a WCDMA (Wideband Code Division Multiple Access, Wideband Code Division Multiple Access) network, a TD-SCDMA (Time Division-Synchronous Code Division Multiple Access, Time Division-Synchronous Code Division Multiple Access) network, and the like. A network element on the LTE network specifically includes a P-GW (Packet Data Network Gateway, packet data network gateway), an S-GW (serving gateway, Serving Gateway), an MME (Mobility Management Entity, mobility management entity), and an eNB (evolved Node B, evolved Node B). A network element on the 2G network specifically includes a P-GW, an S-GW, an SGSN (Serving GPRS Support Node, serving GPRS support node), a BTS (Base Transceiver Station, base transceiver station), and a BSC (Base Station Controller, base station controller) A network element on the 3G network specifically includes a P-GW, an S-GW, an SGSN, a Node B (Node B), and an RNC (Radio Network Controller, radio network controller). For ease of description, in the following embodiments, the application scenario in which the LTE network and the 2G/3G network coexist is described, but the present invention is not limited thereto.

The location area management method provided in this embodiment specifically includes the following steps:

Step 101: A core network controller receives a location update request message sent by a UE in a first network standard.

Step 102: The core network controller generates a paging area list, where the paging area list includes at least a first location area identity used to indicate a location area of the first network standard and a second location area identity used to indicate a location area of a second network standard.

The location area of the first network standard may be a location area in which the UE is located when sending the location update request message in the first network standard, or a location area in which the UE is located when sending the location update request message in the first network standard and a location area that is of the first network standard and is adjacent to the location area, and no limitation is imposed thereto herein.

Step 103: The core network controller adds the paging area list to a location update accept message and sends the location update accept message to the UE.

Specifically, the core network controller (CC) is a newly added network element and performs management on location areas of UEs on the LTE network and the 2G/3G network at the same time. The UE may initiate a location update procedure in a cell on the LTE network or the 2G/3G network. When the LTE network is the first network standard, the 2G/3G network is the second network standard. When the 2G/3G network is the first network standard, the LTE network is the second network standard. The UE may trigger the location update procedure in multiple application scenarios.

In an application scenario, when the UE initiates a location update in idle state, the UE sends an RRC (Radio Resource Control) message to an access network device of the first network standard, such as an eNB on the LTE network, a BSC on the 2G network, or an RNC on the 3G network, where the RRC message carries the location update request message, the location update request message may be implemented by using a NAS (non-access stratum) message, and the location update request message may or may do not carry first location information used to indicate the location area that is of the first network standard and in which the UE is located. When receiving the RRC message, the access network device finds that no context of the UE is stored, determines that the UE is a newly accessed terminal, and sends an initial UE message (Initial UE Message) to the core network controller, where the initial UE message carries the location update request message, and may further carry the first location information. That is, the first location information may be carried in the location update request message and transferred to the core network controller, or may be sent by the access network device to the core network controller by using the initial UE message.

In another application scenario, when the UE initiates a location update in connected state, the UE sends an RRC message to an access network device of the first network standard, where the RRC message carries the location update request message, the location update request message may be implemented by using a NAS message, and the location update request message may or may do not carry first location information used to indicate the location area that is of the first network standard and in which the UE is located. When receiving the RRC message, the access network device finds that a context of the UE is stored, and sends an uplink non-access stratum transport (Uplink NAS Transport) message to the core network controller, where the uplink non-access stratum transport message carries the location update request message, and may further carry the first location information. That is, the first location information may be carried in the location update request message and transferred to the core network controller, or may be sent by the access network device to the core network controller by using the uplink non-access stratum transport message.

When the core network controller receives the location update request message, if the location update request message carries the first location information, or the location update request message is carried in a location update trigger message, where the location update trigger message may be the initial UE message or the uplink NAS transport message, where the location update trigger message carries the first location information, and the first location information is an identity of a location area that is of the first network standard and in which the UE is located when initiating a location update, that the core network controller may generate the paging area list according to the first location information may be specifically mapping the first location information of the first network standard to second location information of the second network standard according to a mapping relationship, so as to generate the paging area list (PAL), where the paging area list includes at least the first location area identity used to indicate the location area of the first network standard and the second location area identity used to indicate the location area of the second network standard.

It should be noted that the mapping relationship may be a coverage relationship between the location area of the first network standard and the location area of the second network standard. For example, the mapping relationship is an adjacent relationship between location areas of the first network standard a coverage relationship between location areas of different standards. In this case, the mapping the first location information of the first network standard to second location information of the second network standard according to a mapping relationship specifically includes: first obtaining, according to the adjacent relationship between location areas of the first network standard, the adjacent location area of the location area in which the UE is located when initiating a location update request, and then obtaining, by using the coverage relationship between location areas of different standards, a location area that is of the second network standard and has coverage overlaps with the location area in which the UE is located and the adjacent location area, so as to obtain the second location information.

For another example, the mapping relationship may be an overlapping coverage relationship between location areas of different standards. Assuming that coverage ranges of two location areas of two standards are the same, there is a mapping relationship between the two location areas. When obtaining a location area identity of either location area of the two location areas, the core network controller may obtain a location area identity of the other location area according to the mapping relationship, so that the core network controller generates the paging area list. The mapping relationship may be specifically recorded in a manner of a mapping table, a data structure, or the like.

The mapping relationship may also be a topology mapping relationship configured by the core network controller. In this case, the core network controller may generate the paging area list according to a network standard in which the UE initiates a location update and a corresponding location area of the network standard in the topology mapping relationship configured by the core network controller.

Optionally, the core network controller may also generate the paging area list according to location information that is of another network standard and is sent by an access network device of a network standard in which a location update is initiated.

Optionally, if a message received by the core network controller includes the first location information and the second location information that is of the second network standard and to which the first location information is mapped, the core network controller may also generate the paging area list according to the first location information and the second location information.

The core network controller adds the paging area list to the location update accept message and sends the location update accept message to the UE, where the location update accept message may be implemented by using a NAS message. After the UE receives the paging area list, when the UE moves in all location areas recorded in the paging area list, except a periodical location update, no location update needs to be initiated.

According to the location area management method provided in this embodiment, a core network controller receives a location update request message sent by a UE, generates a paging area list, where the paging area list includes at least a first location area identity used to indicate a location area of a first network standard and a second location area identity used to indicate a location area of a second network standard, adds the paging area list to a location update accept message, sends the location update accept message to the UE, and notifies the UE that when the UE moves in a location area recorded in the paging area list, except a periodical location update, no location update needs to be initiated, so that unified management of location areas of different network standards by the core network controller and collaboration on an inter-standard location update are implemented, flexibility of location area management is improved, and location updates initiated by UEs with different moving characteristics can be more effectively optimized. At a preliminary stage or even within a period of time during LTE deployment, coverage distribution is discrete. By using the location area management method provided in this embodiment, there is a higher probability that an efficient dynamic paging area is formed in practice according to a moving characteristic of a UE, with the UE being a center, and management efficiency of a location area is improved.

In this embodiment, the location update request message carries first location information, or the location update request message is carried in a location update trigger message, where the location update trigger message carries the first location information, and the first location information is used to indicate a location in which the UE is located when sending the location update request message in the first network standard.

That the core network controller generates a paging area list in step 102 includes:

generating, by the core network controller, the paging area list according to the first location information.

In this embodiment, the location update request message is a non-access stratum message, and the location update trigger message is an initial UE message or an uplink non-access stratum transport message, where the initial UE message or the uplink non-access stratum transport message is sent by an access network device.

Specifically, first, in an example, the UE initiates a location update in a cell on the LTE network. In this case, the LTE network is the first network standard, the 2G/3G network is the second network standard, and the core network controller may acquire the first location information in the following two manners.

In manner 1, the UE sends the location update request message to an eNB, where the location update request message is specifically a tracking area update (TAU) request message, and the TAU request message is a NAS message. The TAU request message carries a tracking area identity (TAI), and a tracking area indicated by the TAI is a tracking area to which the cell in which the UE initiates the location update belongs.

In manner 2, the UE sends the location update request message to an eNB, and the eNB may learn a tracking area to which the cell in which the UE initiates the location update belongs. The eNB sends the location update request message to the core network controller, where the location update request message may carry the first location information, and the first location information includes the TAI. Alternatively, the eNB sends the TAI to the core network controller by using the location update trigger message that carries the location update request message.

Because the core network controller manages location areas of different network standards in a unified manner, the core network controller may map the tracking area on the LTE network to a routing area on the 2G/3G network according to network topology information of the different network standards, and generate the paging area list, where the paging area list includes one or more TAIs and one or more RAIs (routing area identity). The TAI is the first location area identity, and the RAI is the second location area identity.

The core network controller adds the paging area list to the location update accept message and sends the location update accept message to the UE, where the location update accept message may be specifically a tracking area update accept message, and the tracking area update accept message is implemented by using a NAS message. After the UE receives the paging area list, when the UE moves in all the location areas recorded in the paging area list, except a periodical location update, no location update needs to be initiated.

Similarly, when the UE initiates a location update in a cell on the 2G/3G network, the first network standard is the 2G/3G network, the second network standard is the LTE network, and the core network controller may acquire the first location information in the following two manners.

In manner 1, the UE sends a routing area update (RAU) request message to a BSC/an RNC, where the RAU request message is a NAS message. The RAU request message carries a RAI, and a routing area indicated by the RAI is a routing area to which the cell in which the UE initiates the location update belongs.

In manner 2, the UE sends a routing area update request message to a BSC/an RNC, and the BSC/the RNC may learn a tracking area to which the cell in which the UE initiates the location update belongs. The BSC/the RNC sends the location update request message to the core network controller, and adds the first location information to the location update request message, where the first location information includes the RAI. Alternatively, the BSC/the RNC may send the RAI to the core network controller by using the location update trigger message that carries the location update request message.

The core network controller maps the routing area on the 2G/3G network to a tracking area on the LTE network, and generates the paging area list, where the paging area list includes one or more TAIs and one or more RAIs. The RAI is the first location area identity, and the TAI is the second location area identity.

The core network controller adds the paging area list to the location update accept message and sends the location update accept message to the UE, where the location update accept message may be specifically a tracking area update accept message, and the tracking area update accept message is implemented by using a NAS message. After the UE receives the paging area list, when the UE moves in all the location areas recorded in the paging area list, except a periodical location update, no location update needs to be initiated.

The generating, by the core network controller, the paging area list according to the first location information may specifically include:

determining, by the core network controller according to the first location information, the first location area identity used to indicate the location area of the first network standard;

mapping the first location information to the second location information of the second network standard;

determining, according to the second location information, the second location area identity used to indicate the location area of the second network standard; and generating the paging area list according to the first location area identity and the second location area identity.

Specifically, when the UE initiates the location update in the cell on the LTE network, the first location information may include the TAI, and the core network controller may map the tracking area on the LTE network to the routing area on the 2G/3G network according to the network topology information that is of the different network standards and is grasped by the core network controller, and generate the paging area list, where the paging area list includes the one or more TAIs and the one or more RAIs.

When the UE initiates the location update in the cell on the 2G/3G network, the first location information may include the RAI, and the core network controller maps the routing area on the 2G/3G network to the tracking area on the LTE network, and generates the paging area list, where the paging area list includes the one or more TAIs and the one or more RAIs.

The location update trigger message further carries the second location information, and there is a mapping relationship between the first location information and the second location information.

The generating, by the core network controller, the paging area list according to the first location information may specifically include:

determining, by the core network controller according to the first location information, the first location area identity used to indicate the location area of the first network standard; determining, according to the second location information, the second location area identity used to indicate the location area of the second network standard; and generating the paging area list according to the first location area identity and the second location area identity.

Specifically, the location update request message sent by the UE to the access network device carries the first location area identity, and the access network device performs mapping to a location area of another network standard according to the first location area identity, and sends the second location area identity obtained by means of mapping and the first location area identity to the core network controller by using the location update trigger message that carries the location update request message.

Figure 2:
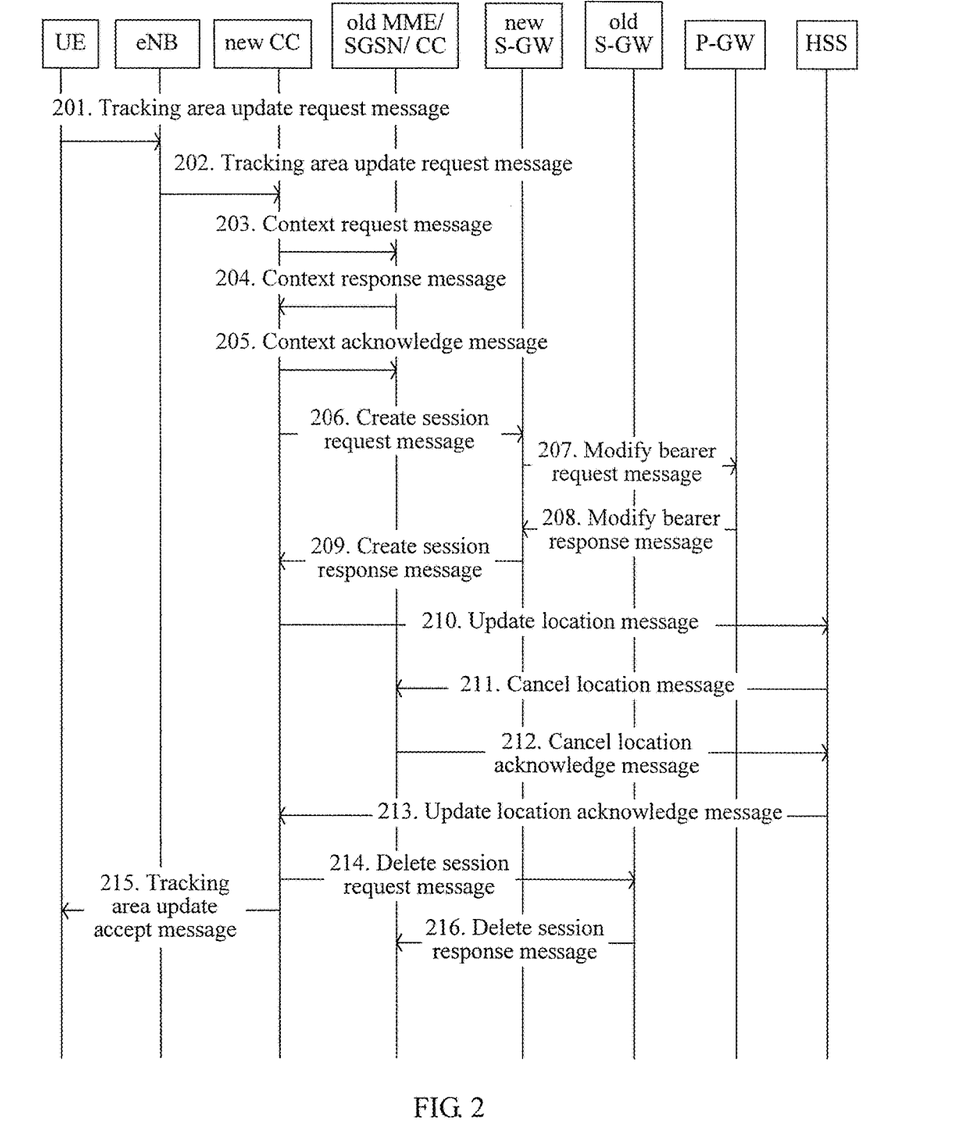
FIG. 2 is a signaling diagram of a location update according to an embodiment of the present invention.

FIG. 2 is a signaling diagram of a location update according to an embodiment of the present invention. With reference to FIG. 2, the following provides a detailed description by using an example in which UE initiates a location update on an LTE network. Network devices that serve the UE before the UE initiates the location update are an old S-GW and an old MME/SGSN/core network controller CC, and network devices that serve the UE after the location update of the UE is performed are a new S-GW and a new CC.

Step 201: The UE sends a tracking area update request message (TAU Request) to an eNB, where the tracking area update request message carries a TAI.

Step 202: The eNB sends the tracking area update request message to the new CC, where the tracking area update request message carries the TAI and a RAI to which the TAI is mapped.

Step 203: The new CC sends a context request message (Context Request) to the old MME/SGSN/CC.

Step 204: The old MME/SGSN/CC sends a context response message (Context Response) to the new CC.

Step 205: The new CC sends a context acknowledge message (Context Acknowledge) to the old MME/SGSN/CC.

Step 206: The new CC sends a create session request message (Create Session Request) to the new S-GW.

Step 207: The new S-GW sends a modify bearer request message (Modify Bearer Request) to a P-GW.

Step 208: The P-GW sends a modify bearer response message (Modify Bearer Response) to the new S-GW.

Step 209: The new S-GW sends a create session response message (Create Session Response) to the new CC.

Step 210: The new CC sends an update location message (Update Location) to an HSS (Home Subscriber Server, home subscriber server).

Step 211: The HSS sends a cancel location message (Cancel Location) to the old MME/SGSN/CC.

Step 212: The old MME/SGSN/CC sends a cancel location acknowledge message (Cancel Location Ack) to the HSS.

Step 213: The HSS sends an update location acknowledge message (Update Location Ack) to the new CC.

Step 214: The old MME/SGSN/CC sends a delete session request message (Delete Session Request) to the old S-GW.

Step 215: The new CC sends a tracking area update accept message (TAU Accept) to the UE, where the tracking area update accept message carries a PAL.

Step 216: The old S-GW sends a delete session response message (Delete Session Response) to the old MME/SGSN/CC.

In a process of gradual implementation of network deployment, in a wireless communication system, a situation may occur in which a core network controller coexists with an MME and an SGSN that are in an existing network. In an area in which no core network controller is deployed, management may be performed on a location area of UE according to a location area management method in the prior art. In a place in which the core network controller is deployed, management may be performed on a location area of the UE according to the method provided in this embodiment.

In this embodiment, the location update request message further carries indication information of supporting management of inter-standard location areas, and the location update accept message further carries indication information of activating management of inter-standard location areas.

In the foregoing application scenario, when initiating a location update, a UE may add, to a location update request message, indication information used to indicate whether management of inter-standard location areas is supported, so that the core network controller can learn whether the UE supports management of inter-standard location areas. If the UE supports management of inter-standard location areas, the core network controller may perform management on a location area of the UE according to the method provided in this embodiment. Otherwise, management may be performed on a location area of the UE according to the location area management method in the prior art. The core network controller may also add, to a location update accept message to be sent to the UE, indication information used to indicate whether management of inter-standard location areas is activated, or the UE may learn, when identifying a paging area list from a received location update accept message, that management of inter-standard location areas is activated. If management of inter-standard location areas on the core network controller is activated, when the UE moves in all location areas recorded in the paging area list, except a periodical location update, no location update needs to be initiated. Otherwise, the UE may initiate a location update in a manner in the prior art.

Figure 3:
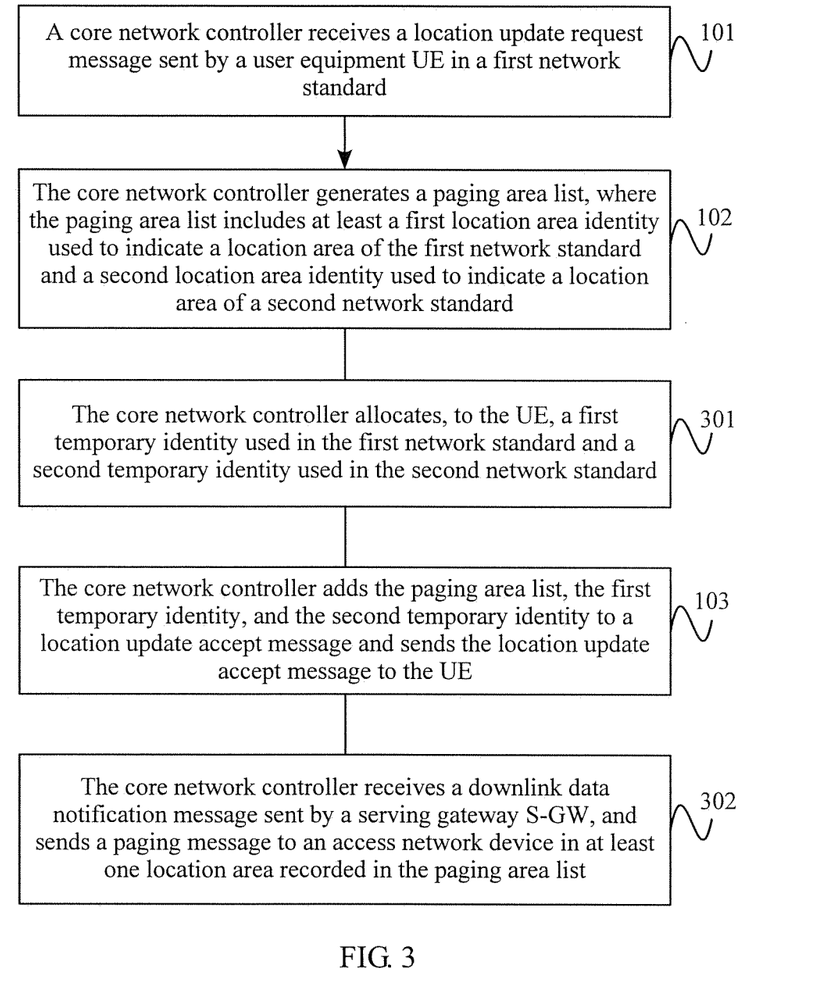
FIG. 3 is a flowchart of a second location area management method according to an embodiment of the present invention.

FIG. 3 is a flowchart of a second location area management method according to an embodiment of the present invention. As shown in FIG. 3, in this embodiment, after that a core network controller receives a location update request message sent by a UE in a first network standard in step 101, before that the core network controller adds the paging area list to a location update accept message and sends the location update accept message to the UE in step 103, the method further includes the following step:

Step 301: The core network controller allocates, to the UE, a first temporary identity used in the first network standard and a second temporary identity used in the second network standard.

Accordingly, that the core network controller adds the paging area list to a location update accept message and sends the location update accept message to the UE in step 103 may specifically include:

adding, by the core network controller, the paging area list, the first temporary identity, and the second temporary identity to the location update accept message and sending the location update accept message to the UE.

Specifically, the core network controller may reallocate, to the UE, temporary identities that are respectively used in the first network standard and the second network standard. For example, the first network standard is the LTE network, and the first temporary identity may be an S-TMSI, where the S-TMSI may be implemented by using a rule in the prior art; the second network standard is the 2G/3G network, and the second temporary identity may be a P-TMSI, where the P-TMSI may also be implemented by using the rule in the prior art.

In this embodiment, after that the core network controller adds the paging area list to a location update accept message and sends the location update accept message to the UE in step 103, the method further includes the following step:

Step 302: The core network controller receives a downlink data notification message sent by a serving gateway S-GW, and sends a paging message to an access network device in at least one location area recorded in the paging area list.

In this embodiment, that the core network controller sends a paging message to an access network device in at least one location area recorded in the paging area list in step 302 includes:

sending, by the core network controller, a first paging message to a first access network device in a location area that is of the first network standard and is recorded in the paging area list, where the first paging message carries the first temporary identity; and sending, by the core network controller, a second paging message to a second access network device in a location area that is of the second network standard and is recorded in the paging area list, where the second paging message carries the second temporary identity.

Specifically, in an example, the first network standard is the LTE network, and the second network standard is the 2G/3G network. When the UE is in idle state, downlink data of the UE reaches a P-GW, the P-GW sends the downlink data to the S-GW, and the S-GW sends the downlink data notification message to the core network controller. The core network controller determines, according to the one or more TAIs recorded in the paging area list, one or more location areas and eNBs to which the one or more location areas belong, and sends the paging message by using a corresponding S1 interface, where the paging message carries the S-TMSI allocated by the core network controller to the UE. The core network controller determines, according to the one or more RAIs recorded in the paging area list, one or more location areas and BSCs/RNCs to which the one or more location areas belong, and sends the paging message by using a corresponding Iu/Gb interface, where the paging message carries the P-TMSI allocated by the core network controller to the UE.

If the core network controller indicates activation of management of inter-standard location areas in the sent location update accept message, the UE may set a TIN to a RAT related TMSI. If the UE initiates a location update on the LTE network, if the core network controller neither indicates activation of management of inter-standard location areas in the sent location update accept message, nor adds an ISR activation indication to the location update accept message, the UE sets the TIN to the S-TMSI. If the UE initiates a location update on the 2G/3G network, if the core network controller neither indicates activation of management of inter-standard location areas in the sent location update accept message, nor adds an ISR activation indication to the location update accept message, the UE sets the TIN to the P-TMSI.

Figure 4:
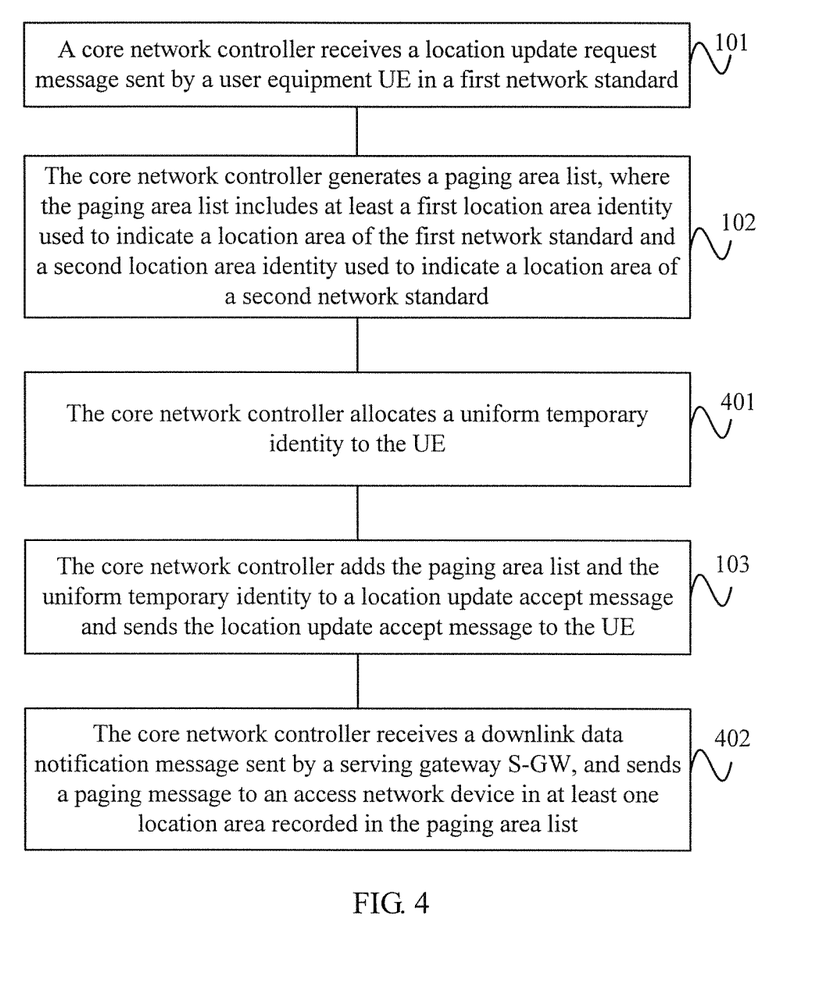
FIG. 4 is a flowchart of a third location area management method according to an embodiment of the present invention.

FIG. 4 is a flowchart of a third location area management method according to an embodiment of the present invention. As shown in FIG. 4, in this embodiment, after that a core network controller receives a location update request message sent by a UE in a first network standard in step 101, before that the core network controller adds the paging area list to a location update accept message and sends the location update accept message to the UE in step 103, the method further includes the following step:

Step 401: The core network controller allocates a uniform temporary identity to the UE.

Accordingly, that the core network controller adds the paging area list to a location update accept message and sends the location update accept message to the UE in step 103 may specifically include:

adding, by the core network controller, the paging area list and the uniform temporary identity to the location update accept message and sending the location update accept message to the UE.

Specifically, the core network controller may further reallocate the uniform temporary identity to the UE, where the uniform temporary identity may be applied in various network standards, and the uniform temporary identity is used to uniquely identify the UE within a period of time. The core network controller sends the uniform temporary identity to the UE by using the location update accept message. When the UE switches to an idle state, in a process of paging the UE, the uniform temporary identity may be added to a paging message, so that the UE may know that paging is being performed on the UE. The uniform temporary identity may be implemented by using a GUTI (globally unique temporary terminal identity), and the GUTI may be generated by using the following rule:

<GUTI> = <GUMMEI><M-TMSI>; where
<GUMMEI> = <MCC><MNC><MME Identifier>; and
<MME Identifier> = <MME Group ID><MME Code>.

M-TMSI represents a unique temporary identity of the UE on an MME, MCC represents a country code of a network on which the UE is located, MNC represents a network code of the network on which the UE is located, MME Group ID represents an identifier of a group in which the MME is located, and MME Code represents a code of the MME in the group.

It should be noted that this embodiment provides only one generating rule of the GUTI, where an existing identifier of the LTE network is used in the generating rule. However, persons skilled in the art may define the GUTI by using another rule, and the present invention is not limited thereto. Combining temporary identities of different network standards is helpful in integrating multi-network standard systems and reducing complexity of a network.

In this embodiment, the location update request message further carries indication information of supporting unified management of a temporary identity, and the location update accept message further carries indication information of activating unified management of a temporary identity.

In the foregoing application scenario, when initiating a location update, the UE may add, to the location update request message, indication information used to indicate whether unified management of a temporary identity is supported, so that the core network controller can learn whether the UE supports unified management of a temporary identity. If the UE supports unified management of a temporary identity, the core network controller may allocate a uniform temporary identity to the UE according to the method provided in this embodiment. Otherwise, a temporary identity may be allocated to the UE according to a manner in the prior art. The core network controller may also add, to the location update accept message to be sent to the UE, indication information used to indicate whether management of a temporary identity is activated, or the UE may learn, when identifying a uniform temporary identity from a received location update accept message, that unified management of a temporary identity is activated. If unified management of a temporary identity on the core network controller is activated, the UE interacts with a network side by using the uniform temporary identity. Otherwise, the UE may interact with the network side in a manner in the prior art.

In this embodiment, after that the core network controller adds the paging area list to a location update accept message and sends the location update accept message to the UE in step 103, the method further includes the following step:

Step 402: The core network controller receives a downlink data notification message sent by a serving gateway S-GW, and sends a paging message to an access network device in at least one location area recorded in the paging area list.

In this embodiment, the paging message carries the uniform temporary identity.

Specifically, when the UE is in idle state, downlink data of the UE reaches a P-GW, the P-GW sends the downlink data to the S-GW, and the S-GW sends the downlink data notification message to the core network controller. The core network controller determines, according to the one or more TAIs recorded in the paging area list, one or more location areas and eNBs to which the one or more location areas belong, and sends the paging message by using a corresponding S1 interface, where the paging message carries the uniform temporary identity allocated by the core network controller to the UE. The core network controller determines, according to the one or more RAIs recorded in the paging area list, one or more location areas and BSCs/RNCs to which the one or more location areas belong, and sends the paging message by using a corresponding Iu/Gb interface, where the paging message carries the uniform temporary identity allocated by the core network controller to the UE.

In this embodiment, that the core network controller sends a paging message to an access network device in at least one location area recorded in the paging area list in step 402 may specifically include:

sending, by the core network controller by using a single radio controller SRC, the paging message to the access network device in the at least one location area recorded in the paging area list.

Specifically, the SRC (single radio controller) may further be disposed in the wireless communication system, the SRC may perform unified management on access network devices that are of different network standards and in a same area, and in the area, there may be one or more access network devices that are of a same network standard and are managed by the SRC. The core network controller communicates with the access network device by using the SRC, and an interface between the core network controller and the SRC may be an SR interface. When the core network controller delivers the paging message to the SRC by using the SR interface, the paging message carries the paging area list, and temporary identities, an S-TMSI and a P-TMSI, that are corresponding to different network standards and allocated by the core network controller to the UE or the uniform temporary identity that may be applied in various network standards and is allocated by the core network controller to the UE. The SRC then sends the paging message to a connected access network device according to the paging area list.

Figure 5:
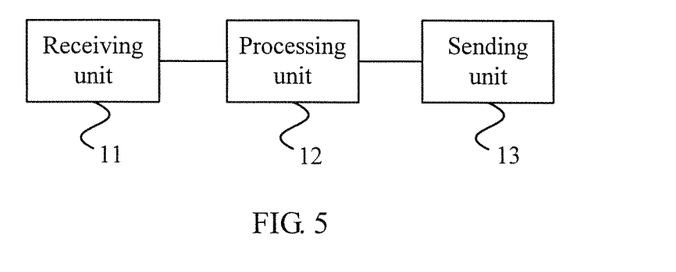
FIG. 5 is a schematic structural diagram of a first core network controller according to an embodiment of the present invention.

FIG. 5 is a schematic structural diagram of a first core network controller according to an embodiment of the present invention. As shown in FIG. 5, the core network controller provided in this embodiment may implement the steps of the location area management method provided in any one of the embodiments of the present invention. A specific implementation process is not described herein again. The core network controller provided in this embodiment specifically includes:

a receiving unit 11, configured to receive a location update request message sent by a UE in a first network standard;

a processing unit 12, configured to generate a paging area list, where the paging area list includes at least a first location area identity used to indicate a location area of the first network standard and a second location area identity used to indicate a location area of a second network standard; and a sending unit 13, configured to add the paging area list generated by the processing unit 12 to a location update accept message and send the location update accept message to the UE.

According to the core network controller provided in this embodiment, a receiving unit 11 receives a location update request message sent by a UE, a processing unit 12 generates a paging area list, where the paging area list includes at least a first location area identity used to indicate a location area of a first network standard and a second location area identity used to indicate a location area of a second network standard, and a sending unit 13 adds the paging area list to a location update accept message, sends the location update accept message to the UE, and notifies the UE that when the UE moves in a location area recorded in the paging area list, except a periodical location update, no location update needs to be initiated, so that unified management of location areas of different network standards by the core network controller and collaboration on an inter-standard location update are implemented, flexibility of location area management is improved, and location updates initiated by UEs with different moving characteristics can be more effectively optimized. At a preliminary stage or even within a period of time during LTE deployment, coverage distribution is discrete. By using the location area management method provided in this embodiment, there is a higher probability that an efficient dynamic paging area is formed in practice according to a moving characteristic of UE, with the UE being a center, and management efficiency of a location area is improved.

In this embodiment, the location update request message carries first location information, or the location update request message is carried in a location update trigger message, where the location update trigger message carries the first location information, and the first location information is used to indicate a location in which the UE is located when sending the location update request message in the first network standard. The processing unit 12 is further configured to generate the paging area list according to the first location information.

In this embodiment, the location update request message is a non-access stratum message, and the location update trigger message is an initial UE message or an uplink non-access stratum transport message, where the initial UE message or the uplink non-access stratum transport message is sent by an access network device.

In this embodiment, the processing unit 12 is further configured to: determine, according to the first location information, the first location area identity used to indicate the location area of the first network standard, map the first location information to second location information of the second network standard according to a mapping relationship, determine, according to the second location information, the second location area identity used to indicate the location area of the second network standard, and generate the paging area list according to the first location area identity and the second location area identity.

In this embodiment, the location update trigger message further carries second location information, and there is a mapping relationship between the first location information and the second location information.

The processing unit 12 is further configured to: determine, according to the first location information, the first location area identity used to indicate the location area of the first network standard, determine, according to the second location information, the second location area identity used to indicate the location area of the second network standard, and generate the paging area list according to the first location area identity and the second location area identity.

In this embodiment, the processing unit 12 is further configured to allocate, to the UE, a first temporary identity used in the first network standard and a second temporary identity used in the second network standard. The sending unit 13 is further configured to add the paging area list, the first temporary identity, and the second temporary identity to the location update accept message and send the location update accept message to the UE.

In this embodiment, the processing unit 12 is further configured to allocate a uniform temporary identity to the UE. The sending unit 13 is further configured to add the paging area list and the uniform temporary identity to the location update accept message and send the location update accept message to the UE.

In this embodiment, the location update request message further carries indication information of supporting unified management of a temporary identity, and the location update accept message further carries indication information of activating unified management of a temporary identity.

In this embodiment, the receiving unit 11 is further configured to receive a downlink data notification message sent by a serving gateway S-GW. The sending unit 13 is further configured to send a paging message to an access network device in at least one location area recorded in the paging area list.

In this embodiment, the paging message carries the uniform temporary identity.

In this embodiment, the sending unit 13 is further configured to: send a first paging message to a first access network device in a location area that is of the first network standard and is recorded in the paging area list, where the first paging message carries the first temporary identity that is allocated to the UE and used in the first network standard, and send a second paging message to a second access network device in a location area that is of the second network standard and is recorded in the paging area list, where the second paging message carries the second temporary identity that is allocated to the UE and used in the second network standard.

In this embodiment, the sending unit 13 is further configured to send, by using a single radio controller SRC, the paging message to the access network device in the at least one location area recorded in the paging area list.

In this embodiment, the location update request message further carries indication information of supporting management of inter-standard location areas, and the location update accept message further carries indication information of activating management of inter-standard location areas.

Figure 6:
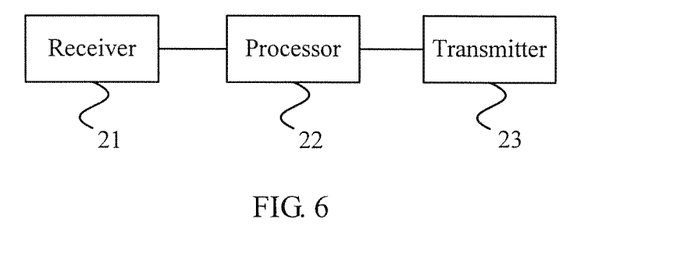
FIG. 6 is a schematic structural diagram of a second core network controller according to an embodiment of the present invention.

FIG. 6 is a schematic structural diagram of a second core network controller according to an embodiment of the present invention. As shown in FIG. 6, the core network controller provided in this embodiment may implement the steps of the location area management method provided in any one of the embodiments of the present invention. A specific implementation process is not described herein again. The core network controller provided in this embodiment specifically includes:

a receiver 21, configured to receive a location update request message sent by a UE in a first network standard;

a processor 22, configured to generate a paging area list, where the paging area list includes at least a first location area identity used to indicate a location area of the first network standard and a second location area identity used to indicate a location area of a second network standard; and a transmitter 23, configured to add the paging area list generated by the processor 22 to a location update accept message and send the location update accept message to the UE.

According to the core network controller provided in this embodiment, unified management of location areas of different network standards by the core network controller and collaboration on an inter-standard location update are implemented, flexibility of location area management is improved, and location updates initiated by UES with different moving characteristics can be more effectively optimized. At a preliminary stage or even within a period of time during LTE deployment, coverage distribution is discrete. By using the location area management method provided in this embodiment, there is a higher probability that an efficient dynamic paging area is formed in practice according to a moving characteristic of UE, with the UE being a center, and management efficiency of a location area is improved.

In this embodiment, the location update request message carries first location information, or the location update request message is carried in a location update trigger message, where the location update trigger message carries the first location information, and the first location information is used to indicate a location in which the UE is located when sending the location update request message in the first network standard. The processor 22 is further configured to generate the paging area list according to the first location information.

In this embodiment, the processor 22 is further configured to: determine, according to the first location information, the first location area identity used to indicate the location area of the first network standard, map the first location information to second location information of the second network standard according to a mapping relationship, determine, according to the second location information, the second location area identity used to indicate the location area of the second network standard, and generate the paging area list according to the first location area identity and the second location area identity.

In this embodiment, the location update trigger message further carries second location information, and there is a mapping relationship between the first location information and the second location information. The processor 22 is further configured to: determine, according to the first location information, the first location area identity used to indicate the location area of the first network standard, determine, according to the second location information, the second location area identity used to indicate the location area of the second network standard, and generate the paging area list according to the first location area identity and the second location area identity.

In this embodiment, the processor 22 is further configured to allocate, to the UE, a first temporary identity used in the first network standard and a second temporary identity used in the second network standard. The transmitter 23 is further configured to add the paging area list, the first temporary identity, and the second temporary identity to the location update accept message and send the location update accept message to the UE.

In this embodiment, the processor 22 is further configured to allocate a uniform temporary identity to the UE. The transmitter 23 is further configured to add the paging area list and the uniform temporary identity to the location update accept message and send the location update accept message to the UE.

In this embodiment, the location update request message further carries indication information of supporting unified management of a temporary identity, and the location update accept message further carries indication information of activating unified management of a temporary identity.

In this embodiment, the receiver 21 is further configured to receive a downlink data notification message sent by a serving gateway S-GW. The transmitter 23 is further configured to send a paging message to an access network device in at least one location area recorded in the paging area list.

In this embodiment, the paging message carries the uniform temporary identity.

In this embodiment, the transmitter 23 is further configured to: send a first paging message to a first access network device in a location area that is of the first network standard and is recorded in the paging area list, where the first paging message carries the first temporary identity that is allocated to the UE and used in the first network standard, and send a second paging message to a second access network device in a location area that is of the second network standard and is recorded in the paging area list, where the second paging message carries the second temporary identity that is allocated to the UE and used in the second network standard.

In this embodiment, the transmitter 23 is further configured to send, by using a single radio controller SRC, the paging message to the access network device in the at least one location area recorded in the paging area list.

In this embodiment, the location update request message is a non-access stratum message, and the location update trigger message is an initial UE message or an uplink non-access stratum transport message, where the initial UE message or the uplink non-access stratum transport message is sent by an access network device.

In this embodiment, the location update request message further carries indication information of supporting management of inter-standard location areas, and the location update accept message further carries indication information of activating management of inter-standard location areas.

Persons of ordinary skill in the art may understand that all or some of the steps of the method embodiments may be implemented by a program instructing relevant hardware. The program may be stored in a computer-readable storage medium. When the program runs, the steps of the method embodiments are performed. The foregoing storage medium includes: any medium that can store program code, such as a ROM, a RAM, a magnetic disk, or an optical disc.

Finally, it should be noted that the foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present invention.

What is claimed is:

1. A location area management method, comprising:
   receiving, by a core network controller, a location update request message sent by a user equipment (UE) in a first network standard;
   generating, by the core network controller, a paging area list according to first location information, the paging area list comprising at least a first location area identity used to indicate a location area of the first network standard and a second location area identity used to indicate a location area of a second network standard; and
   adding, by the core network controller, the paging area list to a location update accept message and sending the location update accept message to the UE,
   wherein generating, by the core network controller, the paging area list according to the first location information comprises:
   determining, by the core network controller according to the first location information, the first location area identity used to indicate the location area of the first network standard;
   mapping, by the core network controller, the first location information to second location information of the second network standard according to a mapping relationship;
   determining, by the core network controller according to the second location information, the second location area identity used to indicate the location area of the second network standard; and
   generating, by the core network controller, the paging area list according to the first location area identity and the second location area identity.

2. The location area management method according to claim 1, wherein:
   the location update request message carries the first location information, or the location update request message is carried in a location update trigger message, wherein the location update trigger message carries the first location information, and the first location information is used to indicate a location in which the UE is located when sending the location update request message in the first network standard.

3. The location area management method according to claim 1, wherein:
   after receiving, by a core network controller, a location update request message sent by a UE in a first network standard and before adding, by the core network controller, the paging area list to a location update accept message and sending the location update accept message to the UE, the method further comprises:
   allocating, by the core network controller to the UE, a first temporary identity used in the first network standard and a second temporary identity used in the second network standard; and
   adding, by the core network controller, the paging area list to a location update accept message and sending the location update accept message to the UE comprises:
   adding, by the core network controller, the paging area list, the first temporary identity, and the second temporary identity to the location update accept message and sending the location update accept message to the UE.

4. The location area management method according to claim 1, wherein:
   after receiving, by a core network controller, a location update request message sent by a UE in a first network standard and before adding, by the core network controller, the paging area list to a location update accept message and sending the location update accept message to the UE, the method further comprises:
   allocating, by the core network controller to the UE, a uniform temporary identity used in the first network standard and the second network standard; and
   adding, by the core network controller, the paging area list to a location update accept message and sending the location update accept message to the UE comprises:
   adding, by the core network controller, the paging area list and the uniform temporary identity to the location update accept message and sending the location update accept message to the UE.

5. The location area management method according to claim 4, wherein:
   the location update request message further carries indication information of supporting unified management of a temporary identity; and
   the location update accept message further carries indication information of activating unified management of a temporary identity.

6. The location area management method according to claim 1, wherein after adding, by the core network controller, the paging area list to a location update accept message and sending the location update accept message to the UE, the method further comprises:
   receiving, by the core network controller, a downlink data notification message sent by a serving gateway (S-GW), and sending a paging message to an access network device in at least one location area recorded in the paging area list.

7. A core network controller, comprising:
   a receiver, configured to receive a location update request message sent by a user equipment (UE) in a first network standard;
   a processor, configured to generate a paging area list according to first location information, the paging area list comprising at least a first location area identity used to indicate a location area of the first network standard and a second location area identity used to indicate a location area of a second network standard; and a transmitter, configured to add the paging area list generated by the processor to a location update accept message and send the location update accept message to the UE, wherein to generate the paging area list, the processor is further configured to:

determine, according to the first location information, the first location area identity used to indicate the location area of the first network standard;

map the first location information to second location information of the second network standard according to a mapping relationship;

determine, according to the second location information, the second location area identity used to indicate the location area of the second network standard; and generate the paging area list according to the first location area identity and the second location area identity.

8. The core network controller according to claim 7, wherein:

the location update request message carries first location information, or the location update request message is carried in a location update trigger message, wherein the location update trigger message carries the first location information, and the first location information is used to indicate a location in which the UE is located when sending the location update request message in the first network standard.

9. The core network controller according to claim 8, wherein the location update request message is a non-access stratum message, and the location update trigger message is an initial UE message or an uplink non-access stratum transport message, wherein the initial UE message or the uplink non-access stratum transport message is sent by an access network device.

10. The core network controller according to claim 7, wherein:

the processor is further configured to allocate, to the UE, a first temporary identity used in the first network standard and a second temporary identity used in the second network standard; and the transmitter is further configured to add the paging area list, the first temporary identity, and the second temporary identity to the location update accept message and send the location update accept message to the UE.

11. The core network controller according to claim 7, wherein:

the processor is further configured to allocate a uniform temporary identity to the UE; and the transmitter is further configured to add the paging area list and the uniform temporary identity to the location update accept message and send the location update accept message to the UE.

12. The core network controller according to claim 11, wherein:

the location update request message further carries indication information of supporting unified management of a temporary identity; and the location update accept message further carries indication information of activating unified management of a temporary identity.

13. The core network controller according to claim 7, wherein:

the receiver is further configured to receive a downlink data notification message sent by a serving gateway (S-GW); and the transmitter is further configured to send a paging message to an access network device in at least one location area recorded in the paging area list.

14. The core network controller according to claim 7, wherein:

the location update request message further carries indication information of supporting management of inter-standard location areas; and the location update accept message further carries indication information of activating management of inter-standard location areas.

* * * * *